No. 794,000.

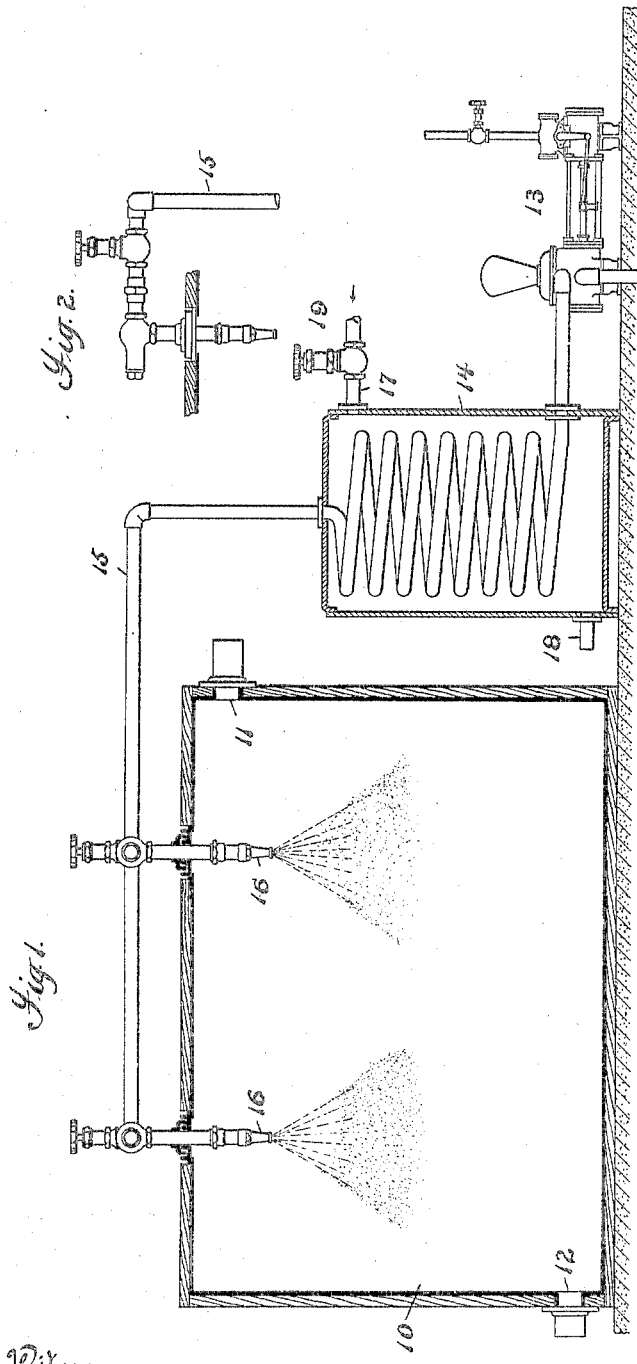

Patented July 4, 1905.

UNITED STATES PATENT OFFICE.

ADALBERT WILHELM FISCHER, OF PHILADELPHIA, PENNSYLVANIA, ASSIGNOR TO SCHUTTE & KOERTING COMPANY, OF PHILADELPHIA, PENNSYLVANIA, A CORPORATION OF PENNSYLVANIA.

PROCESS OF PURIFYING GAS.

SPECIFICATION forming part of Letters Patent No. 794,000, dated July 4, 1905.

Application filed November 26, 1904. Serial No. 234,351.

*To all whom it may concern:*

Be it known that I, ADALBERT WILHELM FISCHER, a subject of the German Emperor, residing at Philadelphia, county of Philadelphia, and State of Pennsylvania, have invented certain new and useful Improvements in Processes of Separating Gases, Vapors, or Particles from Gaseous Mediums, fully described and represented in the following specification and the accompanying drawings, forming a part of the same.

This invention relates to the separation of gases or vapors or suspended particles of dust or other solid matter from gaseous mediums. It has been attempted heretofore to secure such separation by spraying a suitable liquid into a chamber containing the gaseous medium. The liquid so introduced in the form of a more or less fine spray acts by coming into contact with and absorbing the gases or vapors and becoming attached to the particles of solid matter and then falling in the chamber to carry such gases and vapors and particles down with it. As the separating action depends upon the contact of the spray with the gases, vapors, or particles to be separated, this system has proved only partially effective and requires, moreover, the use of large quantities of the absorbing liquid, because the separation or disintegration of the liquid into a spray has been such that the liquid remains in comparatively large subdivisions or portions which present only a comparatively small surface of the liquid for contact with the gases, vapors, or particles to be separated, and such portions, moreover, do not remain a sufficient time in contact with the gases, vapors, or particles, but fall almost immediately.

The object of my invention is to improve such process of separating gases, vapors, and solid particles from gaseous mediums by securing a much more complete disintegration of the absorbing and precipitating liquid than is possible with the mechanical spraying means heretofore employed, and by my invention I obtain a much higher efficiency with the same quantity of absorbing or precipitating liquid and at the same time a much higher concentration of the products of absorption.

The disintegration of the absorbing and precipitating liquid is secured in accordance with my invention by heating the liquid while under pressure to a temperature above the boiling-point of the liquid at the pressure which prevails in the chamber where the spraying is to take place and maintaining the liquid under sufficient pressure to prevent vaporization and then allowing the liquid while so superheated and under pressure to escape into the separating-chamber, preferably through a suitable spraying-nozzle. The use of a spraying-nozzle is not a necessity, as the liquid may be allowed to enter the chamber from any suitable orifice or orifices. If a spraying-nozzle is used, any simple or suitable form may be used. As the liquid escapes into the chamber heated to a temperature above its boiling-point at the pressure in the chamber there will be an immediate and sudden vaporization of the liquid, accompanied by a disintegration of the liquid into minute particles caused by the explosive action of such vaporization, which disintegration in turn aids in securing a more complete vaporization of the liquid. The disintegration above referred to is, as will be understood, additional to the disintegration caused by the use of a spraying-nozzle, if such nozzle be used. The absorbing or precipitating substance is thus introduced into the separating-chamber in a form adapted to present an extent of surface for contact with the gases and vapors and particles to be separated vastly greater than can be secured by the mechanical spraying heretofore employed and without raising the temperature in the chamber. To complete the process of separation, it is necessary that the disintegrated and vaporized substance so introduced into the chamber should be condensed, so that it will precipitate, carrying down with it the vapors and gases which it has absorbed and the solid particles to which it has become attached. It may result in some cases that the substance introduced into the chamber will combine with the gases or vapors to be separated from the gaseous medium, and such resulting vapor or vapors may either be absorbed and carried down by the absorbing substance or themselves condensed to liquid form and so precipitated with the absorbing liquid. The temperature of the chamber is preferably kept low enough to secure such condensation. It is not necessary, however, that such condensation and precipitation should take place in the chamber in which the absorbing substance is introduced into the gaseous medium containing the gases, vapors, or particles to be separated, as the gaseous medium with the disintegrated and vaporized absorbing substance distributed therein might be led to another place where the temperature is reduced to cause such condensation and precipitation. Preferably, however, the temperature of the chamber is kept at a point to secure the condensation and precipitation therein.

It will be understood that the invention is capable of various applications to practical use. For example, as an instance of its use for separating certain gases or particles of matter from other gases which are not absorbed by the liquid sprayed into the separating chamber, I have found my process well adapted for purifying producer-gas made from bituminous coal. Such gas, as is well known, contains a considerable quantity of the tarry products of decomposition of the coal and frequently also particles of solid matter. My process is well adapted for removing such impurities by using water as the absorbing and precipitating fluid.

As another example of a contemplated use for my invention: In the manufacture of sulfuric acid instead of spraying water by mechanical means into the chamber in which the liquid acid is precipitated my process may be employed with great advantage.

The accompanying drawings show a simple form of apparatus adapted for carrying the process into practical operation.

Figure 1 is a diagrammatic view of such apparatus, partly in section; and Fig. 2 is a detail view.

Referring to the drawings, 10 represents a separating-chamber having an inlet 11 for the gaseous medium from which gases or vapors or suspended particles of solid matter are to be separated and having an outlet 12. The separating liquid is forced under pressure by a pump 13 through a coil in a heater 14 and thence through a pipe 15 to nozzles 16, from which it escapes into the separating-chamber. The liquid is heated as it passes through the coil of the heater 14 by means of steam at sufficiently high pressure admitted to the heater through an inlet 17 and allowed to escape through an outlet 18, the inlet 17 being provided with a valve 19, by which the amount of steam entering the heater, and consequently the temperature to which the oil is heated, may be regulated. The separating liquid is forced through the coil and the pipe 15 to the nozzles under a pressure greater than the pressure which prevails in the chamber 10 and is heated to a temperature above its boiling-point at the pressure which prevails in the chamber 10, but below the point at which vaporization would take place under the pressure maintained in the heating coil and pipe 15. The liquid will thus be kept in its liquid state, and as the superheated liquid escapes from the nozzle 16 there will be an immediate and sudden disintegration and vaporization thereof and a thorough distribution of the resulting vapor through the gaseous medium in the separating-chamber, as hereinbefore pointed out. The condensation and precipitation of the disintegrated and vaporized substance thus introduced in the gaseous medium may take place within the separating-chamber, or the gaseous medium with the disintegrated and vaporized substance distributed therein may be lead to another place, where the temperature is reduced to cause such condensation and precipitation.

What is claimed is—

1. The process of separating gases, vapors or particles from gaseous mediums, which consists in heating a liquid to a point above its boiling-point at the pressure of the gaseous medium, preventing vaporization of the liquid by pressure, and delivering the superheated liquid into the gaseous medium, whereby a rapid disintegration and vaporization of the liquid is secured, and condensing and precipitating the substance so introduced into the gaseous medium, substantially as described.

2. The process of separating gases or vapors from gaseous mediums by means of an absorbing liquid, which consists in heating the liquid to a point above its boiling-point at the pressure of the gaseous medium, preventing vaporization of the liquid by pressure, and delivering the superheated liquid into the gaseous medium, whereby a rapid disintegration and vaporization of the liquid is secured, and condensing and precipitating the substance so introduced into the gaseous medium, substantially as described.

3. The process of separating gases, vapors or particles from gaseous mediums, which consists in heating a liquid to a point above its boiling-point at the pressure of the gaseous medium, preventing vaporization of the liquid by pressure, and delivering the superheated liquid into a chamber containing the gaseous medium, whereby a rapid disintegration and vaporization of the liquid is secured, and condensing and precipitating in said chamber the substance so introduced into the gaseous medium, substantially as described.

4. The process of separating gases or vapors from gaseous mediums by means of an absorbing liquid, which consists in heating the liquid to a point above its boiling-point at the pressure of the gaseous medium, preventing vaporization of the liquid by pressure, and delivering the superheated liquid into a chamber containing the gaseous medium, whereby a rapid disintegration and vaporization of the liquid is secured, and condensing and precipitating in said chamber the substance so introduced into the gaseous medium, substantially as described.

5. The process of separating gases, vapors or particles from gaseous mediums, which consists in heating a liquid to a point above its boiling-point at the pressure of the gaseous medium, preventing vaporization of the liquid by pressure, and spraying the superheated liquid into the gaseous medium, whereby a rapid disintegration and vaporization of the liquid is secured, and condensing and precipitating the substance so introduced into the gaseous medium, substantially as described.

In testimony whereof I have hereunto set my hand in the presence of two subscribing witnesses.

ADALBERT WILHELM FISCHER.

Witnesses:
   D. W. HILDRETH,
   SIMON W. SNYDER.